United States Patent
Lai et al.

(10) Patent No.: US 10,664,403 B1
(45) Date of Patent: May 26, 2020

(54) PER-GROUP PREFETCH STATUS TO REDUCE DUPLICATE PREFETCH REQUESTS

(71) Applicant: ATI Technologies ULC, Markham (CA)

(72) Inventors: Leon King Nok Lai, Markham (CA); Qian Ma, Markham (CA); Jimshed B. Mirza, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 16/200,585

(22) Filed: Nov. 26, 2018

(51) Int. Cl.
*G06F 12/08* (2016.01)
*G06F 12/0862* (2016.01)
*G06F 12/0875* (2016.01)
*G06F 12/0871* (2016.01)

(52) U.S. Cl.
CPC ...... *G06F 12/0862* (2013.01); *G06F 12/0871* (2013.01); *G06F 12/0875* (2013.01)

(58) Field of Classification Search
None
See application file for complete search history.

(56) References Cited

U.S. PATENT DOCUMENTS

| 6,286,074 B1 * | 9/2001 | Batchelor | G06F 13/4059 710/305 |
| 6,502,157 B1 * | 12/2002 | Batchelor | G06F 13/4059 710/305 |
| 2007/0239939 A1 * | 10/2007 | Goodman | G06F 12/0862 711/137 |
| 2009/0055595 A1 * | 2/2009 | Gill | G06F 12/0862 711/137 |
| 2010/0115211 A1 * | 5/2010 | de la Iglesia | G06F 11/3485 711/154 |
| 2011/0320415 A1 * | 12/2011 | Berger | G06F 16/24552 707/692 |
| 2013/0346703 A1 * | 12/2013 | McCauley | G06F 12/0862 711/137 |
| 2016/0019065 A1 * | 1/2016 | Hayenga | G06F 9/3816 712/207 |
| 2016/0117250 A1 * | 4/2016 | Lee | G06F 12/0811 711/137 |
| 2018/0107505 A1 * | 4/2018 | Cain, III | G06F 12/0862 |
| 2019/0213130 A1 * | 7/2019 | Madugula | G06F 12/0862 |
| 2019/0303152 A1 * | 10/2019 | Hughes | G06F 9/30036 |

* cited by examiner

*Primary Examiner* — Kevin Verbrugge
(74) *Attorney, Agent, or Firm* — Volpe and Koenig, P.C.

(57) ABSTRACT

A technique for prefetching data for a cache is provided. The technique includes detecting access to a data block. In response to the detection, a prefetch block generates proposed blocks for prefetch. The prefetch block also examines prefetch tracking data to determine whether a prefetch group including the proposed blocks is marked as already having been prefetched. If the group has been marked as already having been prefetched, then prefetch block does not prefetch that data, thereby avoiding traffic between the prefetch block and the cache memory. Using this technique, unnecessary requests to prefetch data into the cache memory are avoided.

20 Claims, 6 Drawing Sheets

FIG. 6 ant_id="1"></a># PER-GROUP PREFETCH STATUS TO REDUCE DUPLICATE PREFETCH REQUESTS

BACKGROUND

Cache memories are used in a wide variety of locations in computing devices. Cache misses occur when data that is requested by a client is not already stored in the cache. Servicing a cache miss requires fetching the requested data from a backing memory (such as system memory or a higher level cache). Prefetching techniques are used to reduce misses by prefetching data into the cache in anticipation of such data being requested by a client. Prefetching techniques are constantly in development.

BRIEF DESCRIPTION OF THE DRAWINGS

A more detailed understanding can be had from the following description, given by way of example in conjunction with the accompanying drawings wherein.

DETAILED DESCRIPTION

A technique for prefetching data for a cache is provided. The technique includes detecting access to a data block. In response to the detection, a prefetch block generates proposed blocks for prefetch. The prefetch block also examines prefetch tracking data to determine whether a prefetch group including the proposed blocks is marked as already having been prefetched. If the group has been marked as already having been prefetched, then prefetch block does not prefetch that data, thereby avoiding traffic between the prefetch block and the cache memory. Using this technique, unnecessary requests to prefetch data into the cache memory are avoided.

Figure 1:
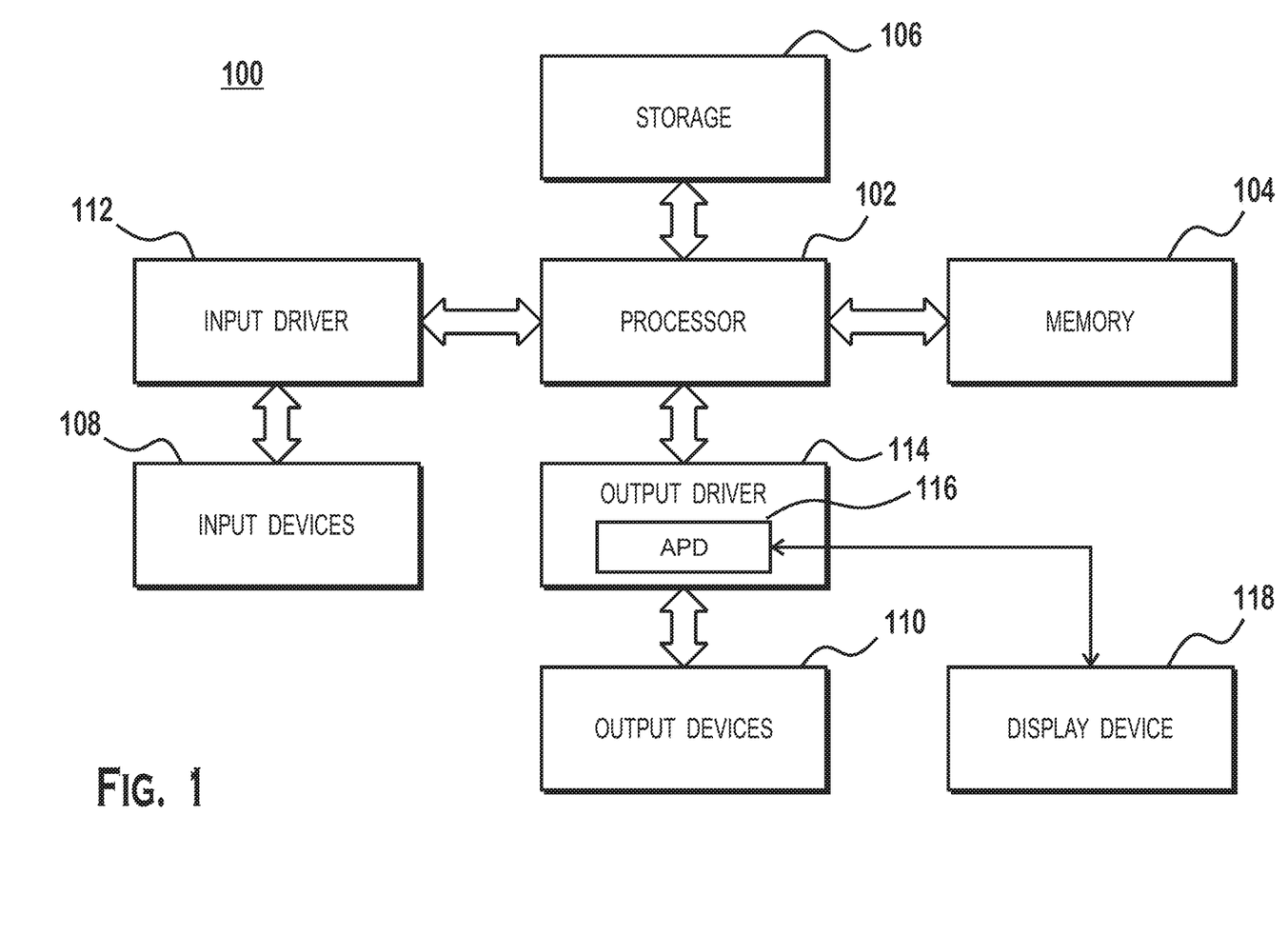
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118.

Figure 2:
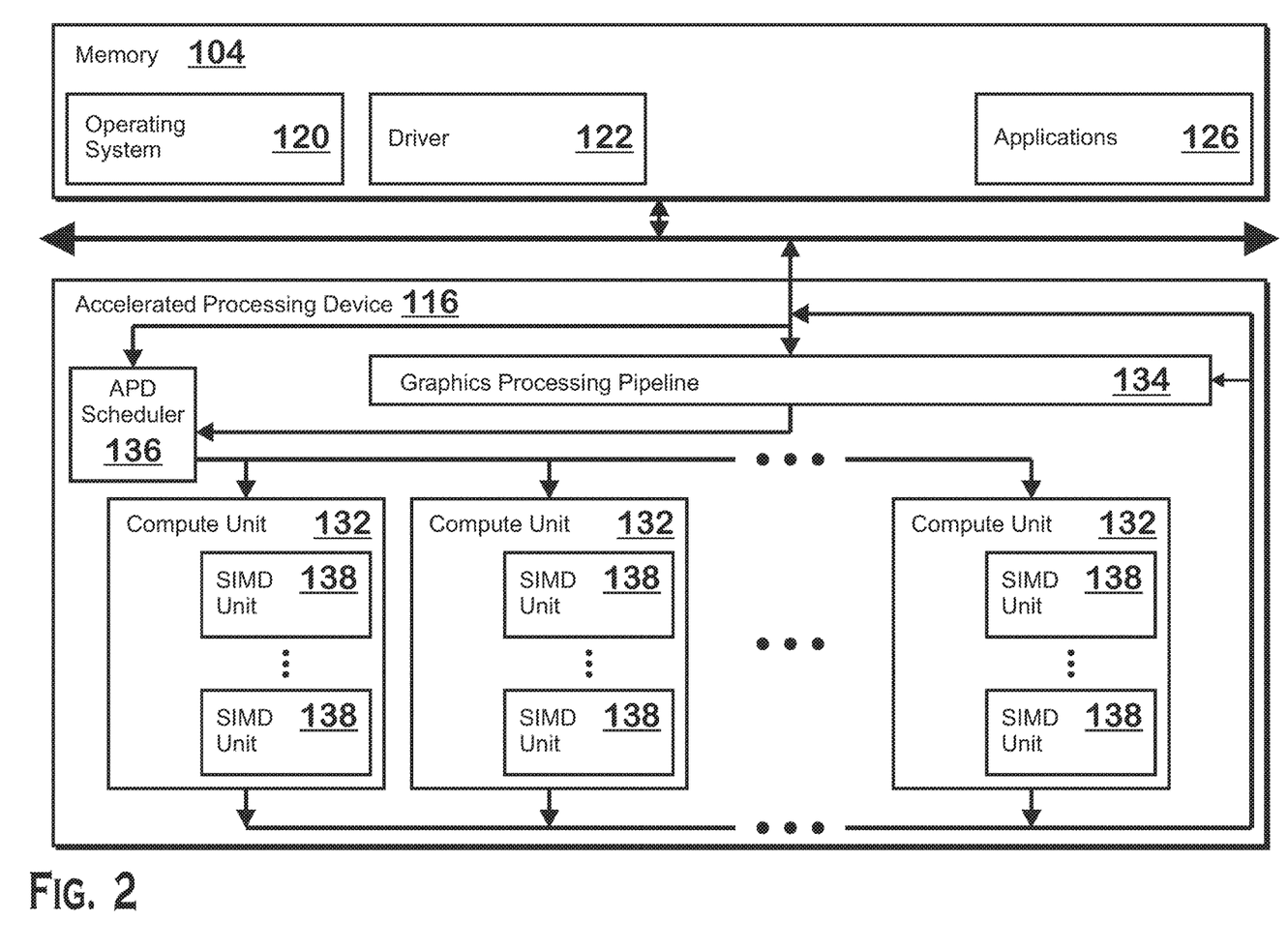
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing.

The APD 116 executes commands and programs for selected functions, such as graphics operations and nongraphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
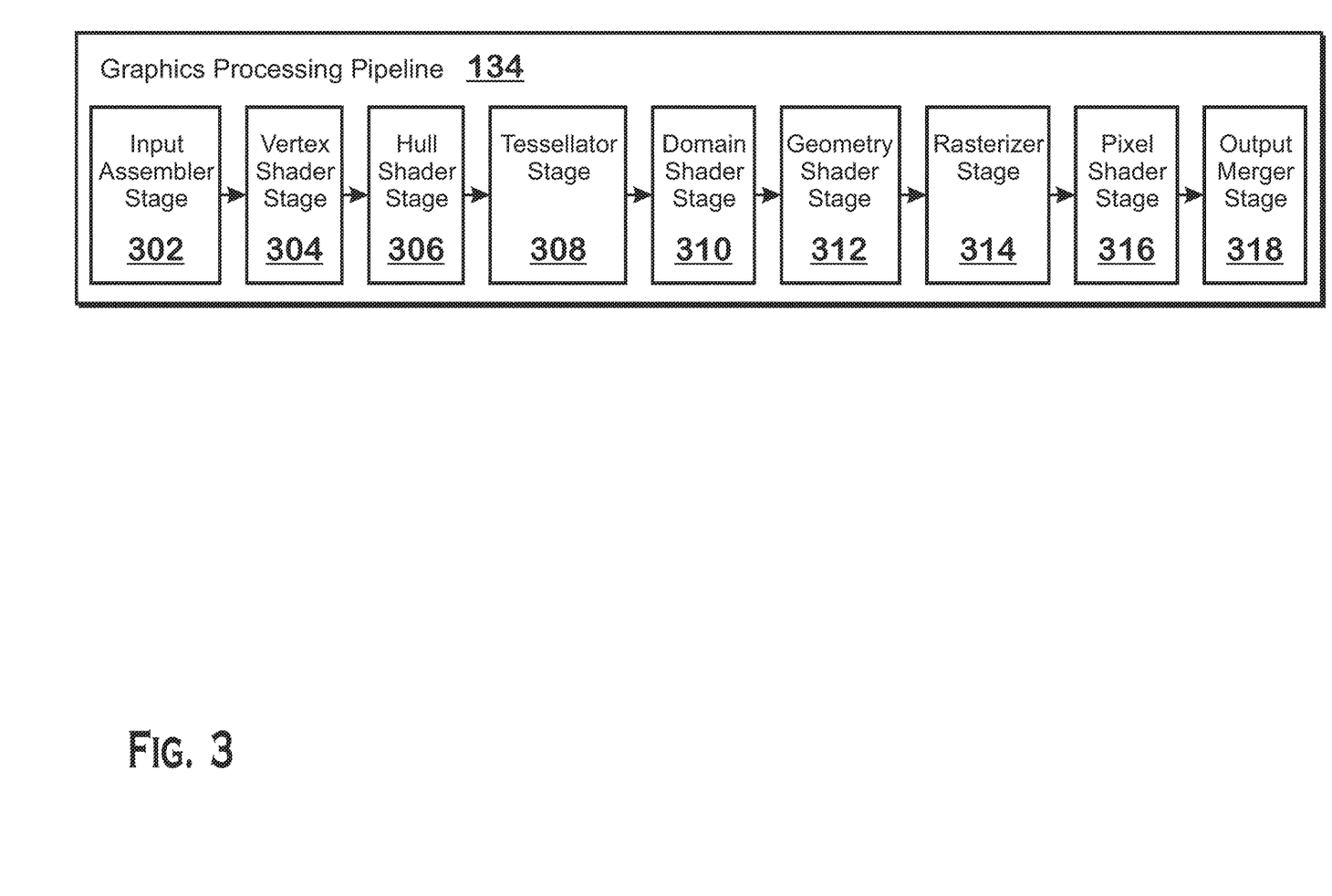
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Caches are typically included throughout computing devices to improve access time. Caches store a subset of data deemed likely to be used. In examples, caches may be accessed by any unit of the system 100, such as the processor 102, or any element of the APD 116, such as the different stages of the graphics processing pipeline 134 or other elements of the APD 116. To reduce the chance of misses, a pre-fetcher may be used to pre-fetch data into a cache.

Figure 4:
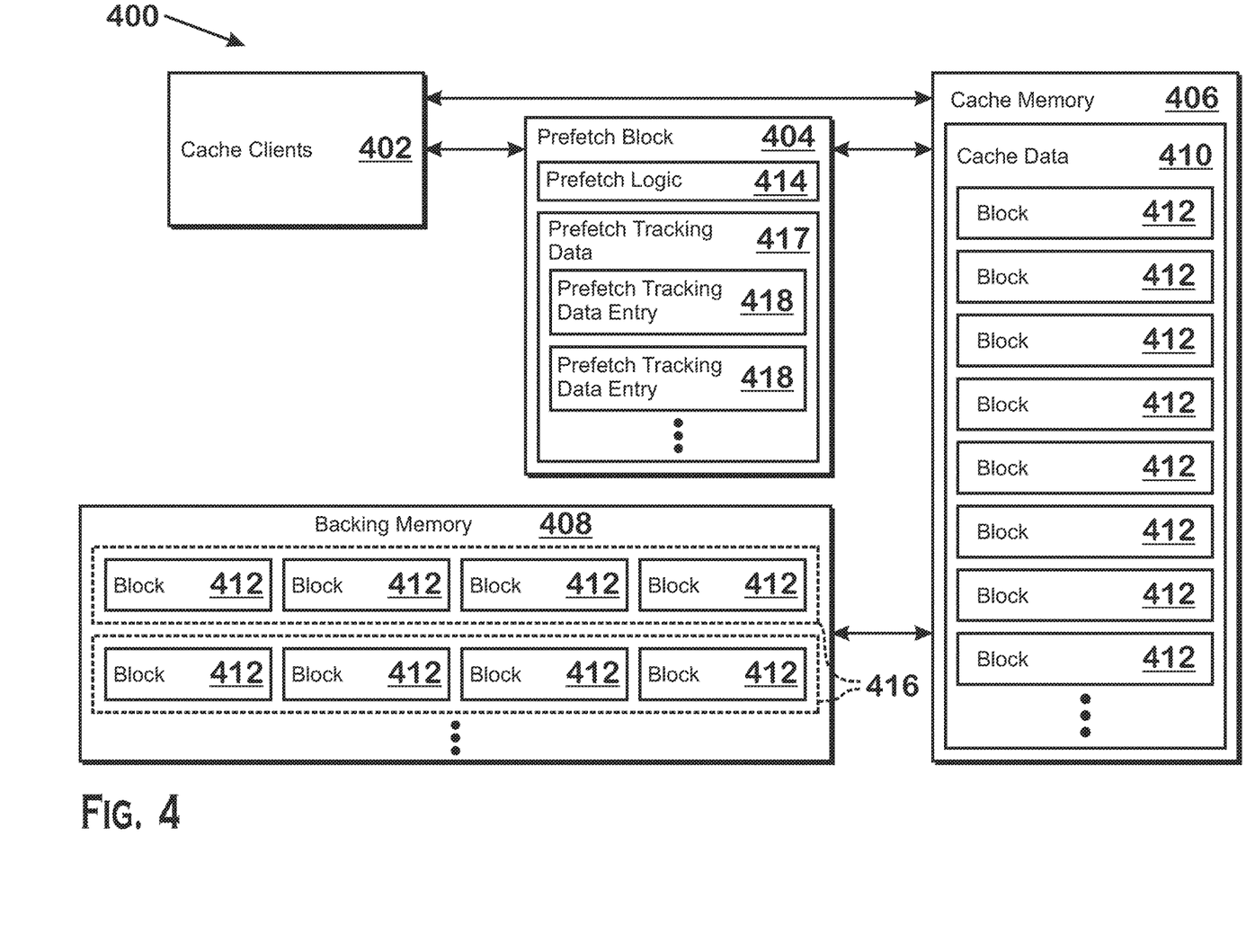
FIG. 4 is a block diagram of a cache prefetching system, according to an example.

FIG. 4 is a block diagram of a cache prefetching system 400, according to an example. The cache system includes one or more cache clients 402, a prefetch block 404, a cache memory 406, and a backing memory 408. The cache client 402 may be any unit that requests access to the cache memory 406. Examples of cache clients include the processor 102, the SIMD units 138, and the graphics processing pipeline 134. The cache memory 406 stores cache data 410 as a plurality of data blocks 412 (shown as "block" in the figures for brevity). In some implementations, a block 412 is the same as a cache line or cache entry. In some implementations, a cache line is the smallest unit of data that that be read into the cache memory 406. In other implementations, a block 412 includes multiple cache lines. The prefetch block 404 includes prefetch logic 414 and prefetch tracking data 416, which includes prefetch tracking data entries 418. The backing memory 408 is a memory that serves as a backing for the cache memory 406. In examples, the backing memory 408 is a higher level cache or system memory (such as memory 104 or a general purpose memory in the APD 116). The backing memory 408 stores a number of data blocks 412 organized into block groups 416. The blocks 412 are arranged in block groups 416. The block groups 416 are groupings of blocks 412 for prefetching purposes as described in greater detail below. Block groups 416 are contiguous regions of an address space.

When a cache client 402 requests to access data in the cache memory 406, the prefetch block 404 prefetches data from the backing memory 408 into the cache memory 406 based on the prefetch logic 414. The prefetch logic 414 implements a specific prefetching technique that determines what blocks 412 to prefetch based on the miss that occurs. In an example, a sequential prefetching technique is used whereby a miss to one block causes subsequent blocks (such as the subsequent 2 or 4 blocks) to be prefetched into the cache memory 406. Although this sequential technique is described as an example prefetching technique, it should be understood that the prefetch logic 414 could implement any technically feasible prefetching technique.

Any particular prefetching operation is bounded to a prefetch block group 416. A block group 416 is a group of blocks 412. In some implementations, a block group 416 is multiple blocks 412 in a contiguous portion of an address space. For example, a block group may include blocks having addresses 10, 11, 12, and 13 in an address space. Being bounded to a prefetch block group 416 means that a prefetch operation will fetch blocks 412 within a single block group 416 but not outside of the block group 416. In an example, if a block group 416 includes blocks X through X+3, and an access is made to block X+1, the prefetch block 404 may prefetch blocks X+2 and X+3 but not X+4 or X−1, which are outside of the block group 416.

The prefetch tracking data 417 assists with limiting the number of duplicate prefetches triggered by the prefetch block 404. More specifically, in some situations, it is possible for the algorithm of the prefetch logic 414 to indicate that the prefetch block 404 should prefetch a block 412 into the cache memory 406 when such blocks are either already stored in the cache memory 406 or were just requested to be prefetched into the cache memory 406. In an example, a cache client 402 accesses data block X. In response, the prefetch logic 414 indicates that data block X+1 and data block X+2 should be prefetched into the cache memory 406. Thus, the prefetch block 404 causes those blocks to be prefetched into the cache memory 406. Subsequently, the cache client 402 accesses data block X+1. In response, the prefetch logic 414 indicates that data block X+2 and X+3 should be prefetched into the cache memory 406. However, the prefetch block 404 has already caused block X+2 to be prefetched into the cache memory 406. Thus, requesting the cache memory 406 to again prefetch that block into the cache memory 406 would represent an inefficiency. In some implementations, this inefficiency is in the form of additional traffic from the prefetch block 404 to the cache memory 406. More specifically, in some implementations, the way in which the prefetch block 404 causes blocks 412 to be prefetched into the cache memory 406 is to instruct the cache memory 406 to read blocks 412 from the backing memory 408 into the cache memory 406. If the cache memory 406 already stores those blocks 412, the cache memory 406 ignores those instructions. However, the instruction to prefetech a block 412 would still represent traffic that could use power and/or delay other traffic and that would ultimately be unnecessary.

The prefetch tracking data 417 helps the prefetch block 404 determine whether to actually instruct the cache memory 406 to prefetch blocks in the situation that the prefetch logic 414 indicates that blocks 412 should be prefetched. Specifically, when the prefetch block 404 instructs the cache memory 406 to prefetch a particular block, the prefetch block 404 also adds a prefetch tracking data entry 418 into the prefetch tracking data 417. The added prefetch tracking data entry 418 indicates that prefetching has been instructed for a block group 416 that contains the block 412. When the prefetch logic 414 indicates that a particular block 412 should be prefetched, the prefetch block 404 checks the prefetch tracking data 417 to determine whether the block group 416 containing the block 412 to be prefetched is already marked as already having been prefetched. If a prefetch tracking data entry 418 indicating that the block group 416 containing the block 412 to be prefetched has already been prefetched exists in the prefetch tracking data 417, then the prefetch block 404 does not request the cache memory 406 prefetch the block to be prefetched. In other words, if any block 412 of a block group 416 has already been prefetched, then the prefetch block 404 does not prefetch other blocks 412 from that block group 416 (at least until the corresponding prefetch tracking data 417 is reset).

In an example, a cache client 402 accesses block X, which is a part of block group A, which includes cache block X, block X+1, block X+2, and block X+3. The prefetch logic 414 determines that, in response to the access to block X, blocks X+1, X+2, and X+3 should be pre-fetched into the cache memory 406. Thus the prefetch block 404 fetches those blocks into the cache memory 406. The prefetch block 404 also creates a prefetch tracking data entry 418 for the block group 416 that contains block X. Subsequently, the cache client 402 accesses block X+1. The prefetch logic 414 determines that blocks X+2 and X+3 should be prefetched into the cache memory 406, but the prefetch block 404 checks the prefetch tracking data 417, which includes the prefetch tracking data entry 418 indicating that the block group 416 including blocks X+2 and X+3 have already been prefetched. As a result, the prefetch block 404 does not instruct the cache memory 406 to prefetch blocks X+2 or X+3.

The prefetch block 404 may invalidate or evict a prefetch tracking data entry 418 (thus "resetting" the status of a corresponding block group 416) in response to a reset event occurring. In one example, the event that resets the status of a block group 416 is all blocks 412 of the block group 416 being evicted from the cache memory 406. In another example, the event is one block being evicted from the cache memory 406. In another example, the reset event occurs according to a timer. When the timer indicates that a certain amount of time has elapsed from the previous reset event, another reset event occurs. The duration of the timer may be fixed or variable. In some implementations that use a variable timer duration, the duration is tuned to (approximately) match the length of time that data stays resident in the cache that the data was prefetched into. This duration can be determined in any technically feasible manner, such as empirically (e.g., by observing the actual duration that data is resident into the cache, which is possible, for example, for caches that have a special purpose use). Any other technically feasible reset event may be used.

Figure 5:
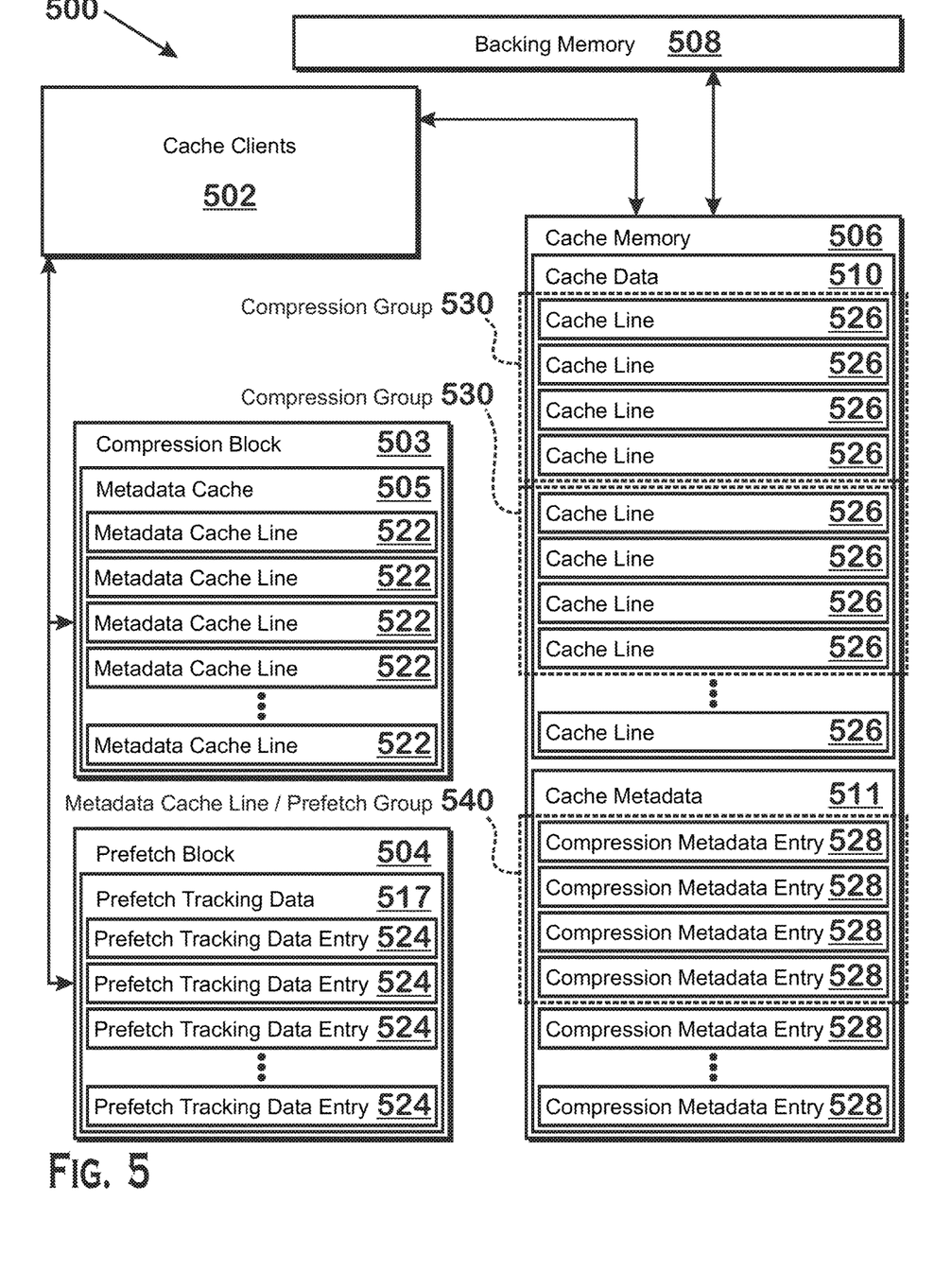
FIG. 5 illustrates the technique in the context of a cache compression system 500, according to an example.

The above techniques for reducing duplicate prefetch techniques are useful in systems that compress data in a cache. FIG. 5 illustrates the technique in the context of a cache compression system 500, according to an example. The cache compression system 500 includes cache clients 502, a compression block 503, a prefetch block 504, a cache memory 506, and a backing memory 508. The compression block 503 includes a metadata cache 505. The prefetch block 504 includes prefetch tracking data 517. The cache memory 506 stores cache data 510 and cache metadata 511.

The cache clients 502 are similar to the cache clients 402 of FIG. 4, in that the cache clients 502 are any unit that requests access to the cache memory 506 (which can be any cache, as with the cache memory 406). The backing memory 508 is similar to the backing memory 408 as well, in that the backing memory 508 stores a larger set of data in an address space than the cache memory 506, which is read into the cache memory 506 when a miss occurs. A prefetch block 504 prefetches data from the backing memory 508 into the cache memory 506.

A compression block 503 performs functionality related to compression of data in the cache memory 506. Specifically, the cache memory 506 stores compressed cache lines 526. When a cache client 502 requests to read a compressed cache line 526, the compression block 503 decompresses the compressed cache line 526 and provides a decompressed cache line to the client 502. When a cache client 502 requests to write to a compressed cache line 526, the compression block 503 compresses data to be written and writes that data into the cache memory 506. The compression block 503 stores compression metadata 511 in compression metadata entries 528. Each compression metadata entry 528 corresponds to a compression group 530 and stores information for the corresponding compression group 530.

Each compression metadata entry 528 stores information about how the corresponding compression group 530 is compressed. In an example, a compression group includes multiple compressed data entries and a compression metadata entry 528 stores information indicating what compressed data entries belong at what locations in the uncompressed data.

Each compression group 530 includes multiple cache lines 526. A compression group 530 is a unit of data processed together by the compression block 503. Specifically, a compression or decompression operation is capable of using data from anywhere in a compression group 530, but not data outside of the compression or decompression operation. In addition, in some implementations, a compression or decompression operation requires all of the data in a compression group 530 to be completed.

The compression block 503 includes a metadata cache 505. The metadata cache stores the cache metadata 511 of the cache memory 506. Each metadata cache line 522, of the metadata cache 505, stores multiple compression metadata entries 528. The metadata cache 505 functions as a standard cache that is dedicated to storing the metadata entries 528. More specifically, when the compression block 503 needs to read a metadata entry 528, the compression block 503 first looks in the metadata cache 505. If a metadata cache line 522 including that metadata entry 528 is not in the metadata cache 505, then the compression block 503 reads in a metadata cache line 522 from the cache metadata 511. If there are no available slots in the metadata cache 505, then the metadata cache 505 evicts a metadata cache line 522 to free up space for the newly read-in metadata cache line 522.

The prefetch block 504 functions in a similar manner to the prefetch block 404 of FIG. 4. The blocks 412 of FIG. 4 correspond to the compression groups 530 of FIG. 5. When a cache client 502 requests to read data in the cache memory 506, and that data is not in the cache memory 506, a miss occurs. The compression block 503 attempts to fetch the entire compression group 530 that the requested data is a part of a miss occurs, because all of that data is required for the compression and decompression operations. In addition, the prefetch block 504 generates prefetch requests for the cache memory 506, where the prefetch requests request prefetching of other compression groups 530 in a prefetch group 540 according to any technically feasible algorithm (similarly to FIG. 4). In addition, when a particular prefetch group 540 is prefetched, the prefetch tracking data 517 includes a prefetch tracking data entry indicating that the prefetch group 540 has been prefetched. When prefetch logic (not shown in FIG. 5) of the prefetch block 504 determines that a compression group 530 is to be fetched into the cache memory 506, the prefetch block 504 checks the prefetch tracking data 517 to determine whether a prefetch group 540 containing that compression group 530 has already been prefetched. If a prefetch tracking data entry 524 indicates that such a prefetch group 540 has already been prefetched, then the prefetch block 504 does not request that the cache memory 506 fetch those compression groups 530 into the cache memory 504. If no such prefetch tracking data entry 524 exists, then the prefetch block 504 performs the prefetching according to the prefetch logic. When a metadata cache line 522 is evicted from the metadata cache 505, the corresponding prefetch tracking data entry 524 is also evicted or invalidated from the prefetch tracking data 517. A metadata cache line 522 and a prefetch tracking data entry 524 both correspond to a particular prefetch group 540. Thus a metadata cache line 522 corresponds to a prefetch tracking data entry 524 when both the metadata cache line 522 and the prefetch tracking data entry 524 refer to the same prefetch group 540.

Figure 6:
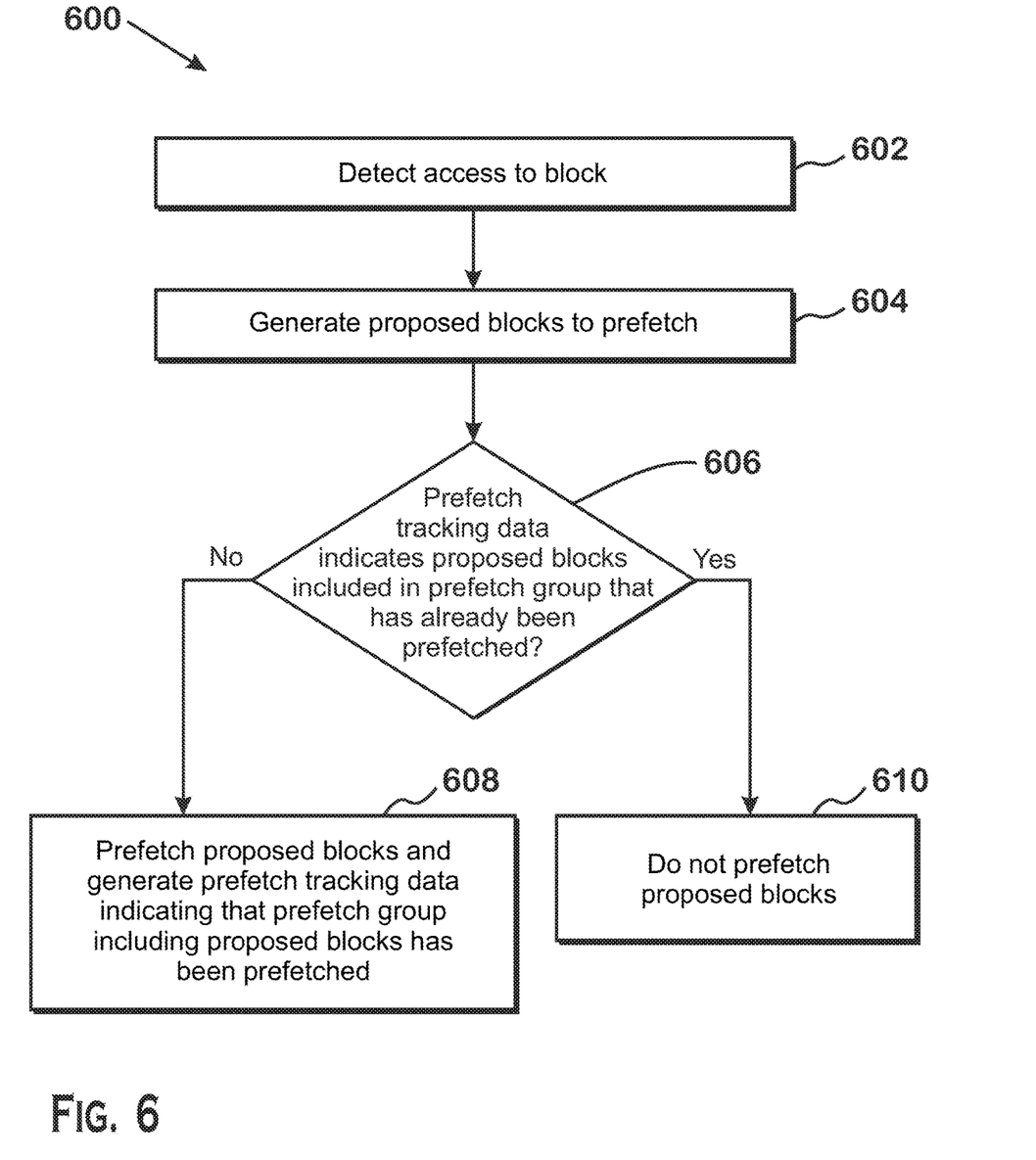
FIG. 6 is a flow diagram of a method for prefetching data into a cache, according to an example.

FIG. 6 is a flow diagram of a method 600 for prefetching data into a cache, according to an example. Although described with respect to the system of FIGS. 1-5, any system, configured to perform the steps of the method 600 in any technically feasible order, falls within the scope of the present disclosure.

The method 600 begins at step 602, where a prefetch block 404 detects access to a block 412. In response, at step 604, prefetch logic 414 generates proposed blocks to prefetch based on an algorithm. Any technically feasible algorithm may be used, but in all situations, the proposed blocks are within the same block group 416 and not external to that block group 416. At step 606, the prefetch block 404 determines whether prefetch tracking data 417 indicates that the proposed blocks are included in a block group that has already been prefetched. If so, the method 600 proceeds to step 610, where the prefetch block 404 does not prefetch the proposed blocks. If not, the method 600 proceeds to step 608, where the prefetch block 404 prefetches the proposed blocks and generates a prefetch tracking data entry 418 indicating that the block group including the proposed blocks has been prefetched. Note that although the steps above were described with respect to the system of FIG. 4, the corresponding elements (typically with the same name) of FIG. 5 could also perform the steps. The term "prefetch group" refers to a block group 416 of FIG. 4 and to a prefetch group 540 of FIG. 5.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for prefetching data into a cache, the method comprising:
   detecting access by a cache client to a data block;
   identifying proposed data blocks for prefetching based on a prefetch method and the data block;
   examining prefetch tracking data to determine whether a prefetch group containing the proposed data blocks is marked as having already been prefetched;
   determining whether to prefetch the proposed data blocks based on the prefetch tracking data; and
   either prefetching or not prefetching the proposed data blocks based on the determining.

2. The method of claim 1, wherein prefetching the proposed data blocks includes sending a request from a prefetch block to a cache memory requesting that the cache memory prefetch the proposed data blocks into the cache memory.

3. The method of claim 1, wherein the proposed data blocks identified for prefetching are all within the prefetch group.

4. The method of claim 1, wherein identifying the proposed data blocks comprises identifying proposed data blocks only within a single prefetch group.

5. The method of claim 1, wherein prefetching the proposed data blocks comprises sending a request from a prefetch block that identifies the proposed data blocks to a cache memory to prefetch the proposed data blocks.

6. The method of claim 1, wherein:
   the prefetch tracking data indicates that the prefetch group containing the proposed data blocks is marked as already prefetched; and
   the method comprises not prefetching the proposed data blocks, thereby avoiding traffic being sent from a prefetch block that identifies the proposed data blocks to a cache memory to prefetch the proposed data blocks.

7. The method of claim 1, wherein the data block comprises a compression block.

8. The method of claim 7, wherein the prefetch group includes multiple compression blocks.

9. The method of claim 8, wherein:
   a cache memory stores compression metadata;
   a prefetch block includes a metadata cache storing metadata cache lines, each corresponding to a prefetch group; and
   the method further includes, in response to a metadata cache line being evicted from the metadata cache, resetting the prefetch tracking data for the prefetch group.

10. A prefetch system comprising:
    a prefetch block; and
    a cache memory;
    wherein the prefetch block is configured to
       detect access by a cache client to a data block;
       identify proposed data blocks for prefetching based on a prefetch method and the data block;
       examine prefetch tracking data to determine whether a prefetch group containing the proposed data blocks is marked as having already been prefetched;
       determine whether to prefetch the proposed data blocks based on the prefetch tracking data; and
       either prefetch or not prefetch the proposed data blocks based on the determining.

11. The prefetch system of claim 10, wherein prefetching the proposed data blocks includes sending a request from a prefetch block to a cache memory requesting that the cache memory prefetch the proposed data blocks into the cache memory.

12. The prefetch system of claim 10, wherein the proposed data blocks identified for prefetching are all within the prefetch group.

13. The prefetch system of claim 10, wherein identifying the proposed data blocks comprises identifying proposed data blocks only within a single prefetch group.

14. The prefetch system of claim 10, wherein prefetching the proposed data blocks comprises sending a request from a prefetch block that identifies the proposed data blocks to a cache memory to prefetch the proposed data blocks.

15. The prefetch system of claim 10, wherein:
the prefetch tracking data indicates that the prefetch group containing the proposed data blocks is marked as already prefetched; and
the prefetch block is configured to not prefetch the proposed data blocks, thereby avoiding traffic being sent from a prefetch block that identifies the proposed data blocks to a cache memory to prefetch the proposed data blocks.

16. The prefetch system of claim 10, wherein the data block comprises a compression block.

17. The prefetch system of claim 16, wherein the prefetch group includes multiple compression blocks.

18. The prefetch system of claim 17, further comprising:
a cache memory storing compression metadata,
wherein the prefetch block includes a metadata cache storing metadata cache lines, each corresponding to a prefetch group; and
the prefetch block is further configured to, in response to a metadata cache line being evicted from the metadata cache, reset the prefetch tracking data for the prefetch group.

19. A computing system comprising:
a cache client; and
a prefetch system comprising:
a prefetch block; and
a cache memory;
wherein the prefetch block is configured to
detect access by the cache client to a data block;
identify proposed data blocks for prefetching based on a prefetch method and the data block;
examine prefetch tracking data to determine whether a prefetch group containing the proposed data blocks is marked as having already been prefetched;
determine whether to prefetch the proposed data blocks based on the prefetch tracking data; and
either prefetch or not prefetch the proposed data blocks based on the determining.

20. The computing system of claim 19, wherein:
the prefetch tracking data indicates that the prefetch group containing the proposed data blocks is marked as already prefetched; and
the prefetch block is configured to not prefetch the proposed data blocks, thereby avoiding traffic being sent from a prefetch block that identifies the proposed data blocks to a cache memory to prefetch the proposed data blocks.

* * * * *